US012717021B2

(12) United States Patent
Shin

(10) Patent No.: US 12,717,021 B2
(45) Date of Patent: Aug. 25, 2026

(54) SYSTEM AND METHOD FOR MOTION CAPTURE

(71) Applicant: Google LLC, Mountain View, CA (US)

(72) Inventor: Dongeek Shin, San Jose, CA (US)

(73) Assignee: GOOGLE LLC, Mountain View, CA (US)

(*) Notice: Subject to any disclaimer, the term of this patent is extended or adjusted under 35 U.S.C. 154(b) by 338 days.

(21) Appl. No.: 18/571,627

(22) PCT Filed: Jun. 28, 2021

(86) PCT No.: PCT/US2021/070781
§ 371 (c)(1),
(2) Date: Dec. 18, 2023

(87) PCT Pub. No.: WO2023/277952
PCT Pub. Date: Jan. 5, 2023

(65) Prior Publication Data

US 2024/0280687 A1 Aug. 22, 2024

(51) Int. Cl.
*G01S 13/87* (2006.01)
*G01S 13/76* (2006.01)
*G06K 7/10* (2006.01)

(52) U.S. Cl.
CPC .......... *G01S 13/878* (2013.01); *G01S 13/765* (2013.01); *G06K 7/10366* (2013.01)

(58) Field of Classification Search
CPC ...................................................... G01S 13/878
See application file for complete search history.

(56) References Cited

U.S. PATENT DOCUMENTS

2011/0046915 A1 2/2011 Hol et al.
2012/0220233 A1* 8/2012 Teague .................... H04W 4/21 455/41.2
2013/0225200 A1 8/2013 Ben et al.
2021/0185491 A1* 6/2021 Chakraborty ........... G06F 18/22
2021/0200311 A1* 7/2021 Kerber .................... G06F 3/011
(Continued)

FOREIGN PATENT DOCUMENTS

EP 2681900 B1 3/2018
WO WO-2014114967 A1 * 7/2014 ........... A61B 5/1114
WO WO-2015187991 A1 * 12/2015 ......... G06K 7/10306

OTHER PUBLICATIONS

International Search Report and Written Opinion for PCT Application No. PCT/US2021/070781, mailed on Mar. 28, 2022, 12 pages.
(Continued)

*Primary Examiner* — Steven Lim
(74) *Attorney, Agent, or Firm* — Brake Hughes Bellermann LLP

(57) ABSTRACT

Ultra-wideband (UWB) tags can be used as part of a high-resolution motion capture system that may not require a cost or a complexity that is typically associated with visually based motion capture systems. The UWB based motion capture uses a bundle of UWB tags, which in a possible implementation, can be affixed to body parts of a user to sense motion of the body parts. The absolute positions of each UWB tag can then be determined by reconstructing a skeletal topology from a Euclidean distance matrix based on inter-tag ranging measurements using handshake signals of a UWB protocol.

20 Claims, 15 Drawing Sheets

(56) References Cited

U.S. PATENT DOCUMENTS

| | | | | |
|---|---|---|---|---|
| 2022/0244367 | A1 * | 8/2022 | Shin | G01S 11/04 |
| 2024/0013410 | A1 * | 1/2024 | Mochizuki | G06T 7/251 |

OTHER PUBLICATIONS

Li, et al., "An Indoor Location Algorithm Based on Kalman Filter Fusion of Ultra-Wide Band and Inertial Measurement Unit", AIP Advances: vol. 9, No. 8, Aug. 13, 2019, 66 pages.

* cited by examiner

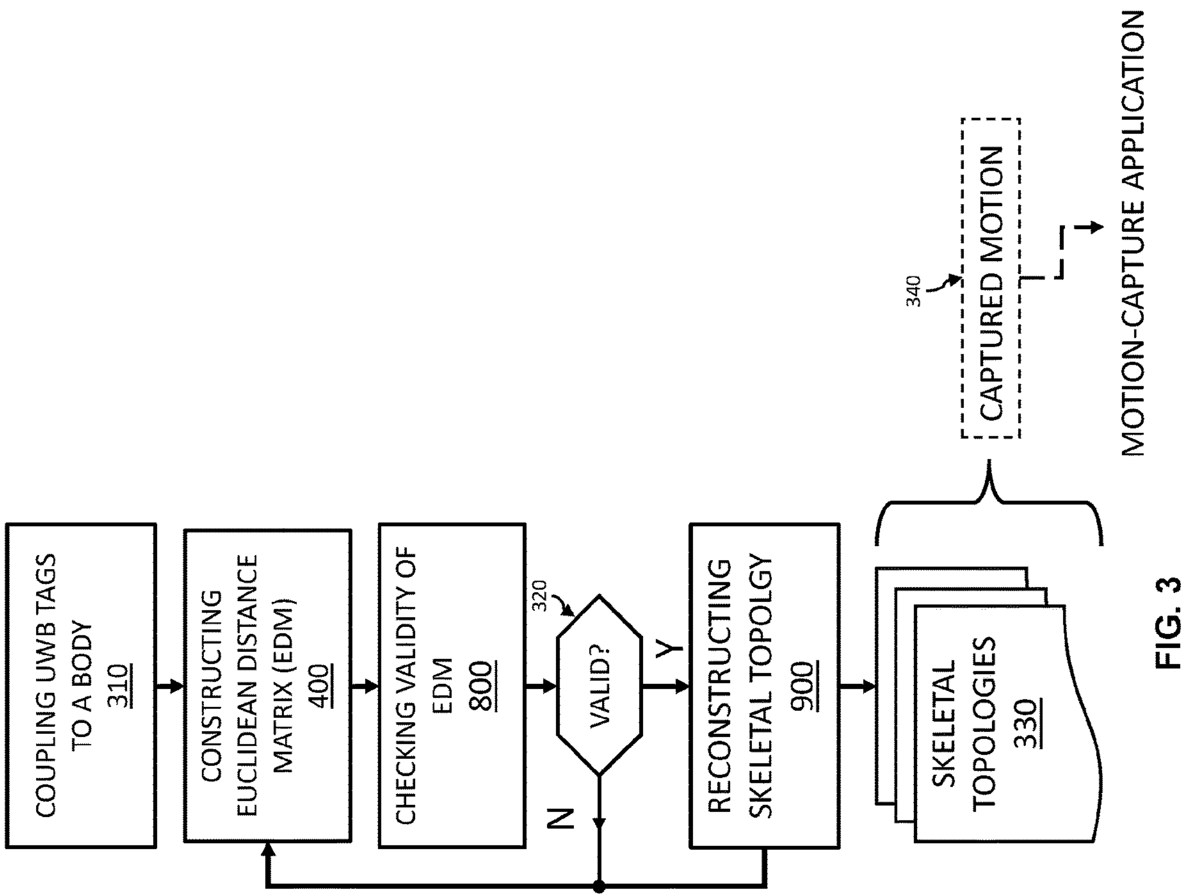
FIG. 3

1300
1110
1111
1310

SYSTEM AND METHOD FOR MOTION CAPTURE

CROSS-REFERENCE TO RELATED APPLICATION

This application is a 35 U.S.C. § 371 National Phase Entry Application from PCT/US2021/070781, filed on Jun. 28, 2021, entitled "SYSTEM AND METHOD FOR MOTION CAPTURE", the disclosure of which is incorporated herein by reference in its entirety.

FIELD OF THE DISCLOSURE

The present disclosure relates to motion capture and more specifically to systems and methods for motion capture that utilize ultra-wideband tracking devices.

BACKGROUND

The movement of a person can be digitally recorded (i.e., captured) using motion tracking. The process of motion tracking includes sensing a person to determine three-dimensional (3D) positions of a plurality of points on the person. A digital skeletal representation of the person can then be generated with the 3D positions as nodes in the digital skeletal representation. The process can be repeated at intervals to update the digital skeletal representation so that movement of the nodes can be tracked. Optical systems for sensing may impose requirements that can limit potential uses of motion capture. For example, these optical systems may be expensive and may require control over the sensed environment and/or the person. Reducing these requirements may make motion capture more available and usable to a wider range of users and applications.

SUMMARY

In at least one aspect, the present disclosure generally describes a method for motion capture. The method includes coupling ultra-wideband (UWB) tags to a body. The method further includes constructing a distance matrix (DM). Constructing the DM can include successively configuring each UWB tag as an anchor tag, determining distances between the anchor tag and other UWB tags, and updating the DM with the determined distances until each UWB tag has been configured as the anchor tag. The method further includes reconstructing a skeletal topology of the body based on the DM, where the skeletal topology includes nodes corresponding to three-dimensional (3D) positions of the UWB tags.

In some examples, the method comprises coupling a plurality of ultra-wideband (UWB) tags to a body. The method further includes constructing a distance matrix, wherein the constructing includes: successively configuring (in turn, or one after another) each UWB tag as an anchor tag: determining distances between the anchor tag and one or more (optionally each) of the other UWB tags of the plurality of UWB tags; and updating the distance matrix with the determined distances until each UWB tag has been configured as the anchor tag. The method further includes reconstructing a skeletal topology of the body based on the distance matrix, the skeletal topology including nodes corresponding to three-dimensional (3D) positions of the plurality of UWB tags in space. The method further includes repeating the constructing and the reconstructing to generate a set of skeletal topologies, the set of skeletal topologies arranged in time to capture a motion or movement of the body through space.

In a possible implementation of the method, the body includes a first object and a second object, where a first portion of the (plurality of) UWB tags are coupled to a first object and a second portion of the (plurality of) UWB tags are coupled to the second object.

In another possible implementation of the method, a first UWB tag of the UWB tags is integrated with a mobile computing device worn or carried by a user. For example, the mobile computing device is (or comprises) a pair of augmented reality (AR) glasses.

In another possible implementation of the method, the distance matrix is a Euclidean distance matrix (EDM). For these implementations, the method can further include checking a validity of the EDM. For example, checking the validity of the EDM can include comparing off-diagonal elements of the EDM to a first threshold and determining that the EDM is invalid if any off-diagonal element is below the first threshold. Additionally, or alternatively, checking the validity of the EDM can include comparing diagonal elements of the EDM to a second threshold and determining that the EDM is invalid if any diagonal element is above the second threshold. Additionally, checking the validity of the EDM can include determining that the EDM is invalid and discarding the EDM determined invalid before reconstructing the skeletal topology.

In another possible implementation of the method, the UWB tags are communicatively coupled to a hub device. For this implementation, the method can further include capturing calibration data, which corresponds to a topology of the UWB tags in a fixed coordinate system using the hub device, and reconstructing the skeletal topology based on the DM and the calibration data. For this implementation, the calibration data can include identification information of each UWB tag and location information of each UWB tag relative to the body that is correlated to the identification information. Additionally, or alternatively, the calibration data can include orientation data of a UWB tag captured by an inertial measurement unit (IMU) integrated with the UWB tag. For example, on or more of the plurality of UWB tags can include or be integrated with a respective IMU.

In another possible implementation of the method, the method further includes transmitting the motion of the body to an augmented reality application, where the motion of the body is captured in real time.

In another possible implementation of the method, determining distances between the anchor tag and other UWB tags includes measuring round-trip times of handshake signals transmitted between the anchor tag and the other UWB tags.

In another aspect, the present disclosure generally describes a system for motion capture. The system includes a first set of UWB tags coupled to a first body. The UWB tags in the first set are configurable to take turns performing a handshake protocol with each other to determine elements of a distance matrix (DM) for the first set (of UWB tags), where the elements correspond to pairwise distances between the UWB tags. The system further includes a hub device that is communicatively coupled to one or more of the UWB tags. The hub device includes a processor that is configured by software instructions to reconstruct a skeletal topology of the first body based on the DM.

In a possible implementation of the system, the processor of the hub device is further configured by software instructions to generate a set of skeletal topologies from a plurality of DMs that are generated (i.e., constructed) at regular intervals.

In another possible implementation of the system, the processor of the hub device is further configured by software instructions to receive elements of the DM from each UWB tag and to generate the DM from the received elements.

In another possible implementation of the system, the processor of the hub device is further configured by software instructions to receive an DM generated by one of the UWB tags.

In another possible implementation of the system, the UWB tags communicate the handshake protocol using UWB communication and the hub device is communicatively coupled to the UWB tags using Bluetooth communication.

In another possible implementation of the system, the hub device includes a UWB tag that is in the first set of UWB tags. In this implementation, the hub device can be (or can comprise) augmented reality (AR) glasses.

In another possible implementation of the system, the system further includes a second set of UWB tags coupled to a second body (different to the first body). The UWB tags in the second set are configurable to take turns performing a handshake protocol with each other to determine elements of an (optionally Euclidean) distance matrix for the second set. The UWB tags in the second set are also configured to communicate the Euclidean distance matrix to the hub device for reconstruction of a skeletal topology of the second body.

In another possible implementation of the system, the distance matrix (DM) for the first set is a Euclidean distance matrix (EDM). In these implementations, the processor of the hub device may be further configured by software instructions to check a validity of the EDM before reconstructing a skeletal topology of the first body based on the EDM.

In another possible implementation of the system, the processor of the hub device is further configured by software instructions to generate a set of skeletal topologies over time to capture a motion of the first body and transmit the motion of the first body to a motion-capture application.

In another aspect, the present disclosure generally describes a method for motion capture. The method includes acquiring round-trip times between pairs of UWB tags affixed to points on a body, wherein the round-trip times are based on a handshake protocol (between the UWB tags of each pair). The method further includes estimating a pose of the body by (i) computing a DM based on the round-trip times, (ii) checking a validity of the DM, and (iii) reconstructing a skeletal topology of the body, where the skeletal topology includes nodes corresponding to 3D positions of the points on the body. The method further includes repeating the acquiring and the estimating to capture a motion of the body. For example, multiple poses of the body can be estimated at different points in time to capture a motion of the body through an environment.

In a possible implementation of the method, the skeletal topology further includes edges between the nodes. The edges are determined or estimated based on calibration data including spatial relationships between the UWB tags and the points on the body (e.g., the points on the body to which the UWB tags are affixed).

In another possible implementation of the method, the distance matrix is a Euclidean distance matrix.

In another possible implementation of the method, the method further includes transmitting the motion of the body to an augmented reality application.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

FIG. 3 is a flowchart of a method for motion capture according to a possible implementation of the present disclosure.

The components in the drawings are not necessarily to scale relative to each other. Like reference numerals designate corresponding parts throughout the several views.

DETAILED DESCRIPTION

Figure 1:
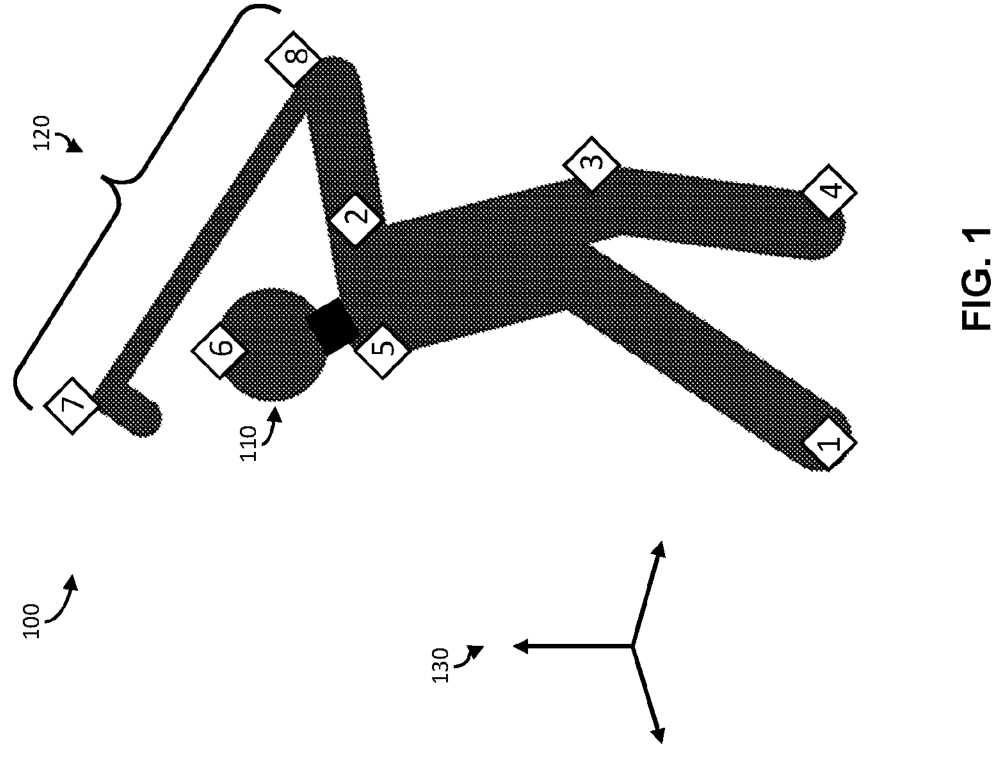
FIG. 1 graphically illustrates ultra-wideband tags coupled to a body for motion capture according to a possible implementation of the present disclosure.

The present disclosure describes systems and methods for motion capture. The disclosed approach includes a sensing technique that utilizes general-purpose ultra-wideband (UWB) tags (i.e., UWB trackers), which makes it less complex than optical sensing techniques and more accurate (e.g., higher resolution) than inertial measurement unit (IMU) sensing techniques. The disclosed approach may have the technical effect of simplifying a physical setup, data collection, and/or a computation, which can make the disclosed motion capture available where it would otherwise be prohibited by cost/complexity. The disclosed approach can also facilitate motion capture of a body without the need for constraints from a kinematic model (or kinematic body model), which can have the technical effect of simplifying the underlying computations, facilitating quicker and more resource efficient motion capture. Moreover, the disclosed approach can allow pose estimation to be performed without the requirement for a stationary node (or tag), which can have the technical effect of improving flexibility and portability of motion capture.

The disclosed approach uses inter-tag range (i.e., distance) measurements based on round-trip times for communication between pairs of UWB tags affixed to points on a body. A pose of the body at a particular time may be estimated via a three-step process, including (i) computing a distance matrix based on the round-trip times, (ii) checking a validity (i.e., fidelity) of the distance matrix, and (iii) reconstructing a (digital) skeletal topology of the body. The three-step process may be repeated over time (e.g., at regular intervals) in order to track the motion of the skeletal topology and thereby capture a motion of the body that it represents. The motion capture may occur in real-time (e.g., relative to a user) and may therefore be used for real-time devices/applications, such as those related to augmented reality (AR).

As used herein, a "body" generally refers to a movable form that can consist of multiple parts. Each of the multiple parts of the body can be living and move under its own power or can be inanimate and move as a result of an applied power.

As used herein, a "UWB tag" generally refers to a wireless electronic device, attachable to a body, that is configured to communicate with other UWB tags via UWB communication in a UWB network. While UWB tags can be small unitary devices, in some implementations, a mobile computing device (e.g., AR glasses) may be configured to operate as a UWB tag.

As used herein, an "anchor tag" refers to a UWB tag in the UWB network that is configured to initiate communication (e.g., a handshake) with other UWB tags in the network. While each UWB tag in the UWB network may be configured (i.e., designated) as the anchor tag, only one anchor tag is designated at any given time. Each of a plurality of UWB tags coupled to a body can therefore be successively configured (i.e. configured one at a time, in turn) as an anchor tag.

As used herein, a "receiver tag" refers to a UWB tag in the UWB network that is configured to respond to communication (e.g., a handshake) initiated by an anchor tag.

As used herein, a "distance matrix" (DM) generally refers to a matrix containing elements corresponding to distances (i.e., ranges) between pairs of UWB tags in the UWB network. Each row in the distance matrix may correspond to a first UWB tag in the pair, while each column may correspond to a second UWB tag in the pair. One type of distance matrix is the "Euclidean distance matrix" (EDM) in which the elements correspond to squared distances between pairs of UWB tags.

As used herein, a distance matrix may be "valid" if its elements comport with expected characteristics of the distance matrix. For example, a distance from a first UWB tag to itself is expected to be zero. In another example, the distance matrix may on be valid when the matrix is symmetrical.

As used herein, a "skeletal topology" is a digital representation of the body. The skeletal topology can include "nodes" that are arranged according to the arrangement of the UWB tags on the body. The skeletal topology can also include "edges" that link some nodes based on the arrangement of the UWB tags on the body.

As used herein, a "hub device" generally refers to a computing device that can handle all or part of the processing necessary to generate a skeletal topology. The hub device may be part of the UWB network or otherwise in communication with the UWB network. In other words, the hub device need not be stationary, but could be coupled to the body.

As used herein, a "fixed coordinate system" is a frame of reference that defines a space that the body (i.e., the UWB tags) may move within.

As used herein, "intervals" may be periods of time between poses of a body, where each pose represents a sample (i.e., snapshot) of a body in motion at a particular time.

As used herein, "motion-capture application" generally refers to an application running on a processor of a computing device that is configured to determine (e.g., measure, recognize) a motion captured by a set of skeletal topologies. In some implementations, the motion-capture application can be part of an augmented-reality application.

FIG. 1 illustrates UWB tags coupled to a body 100 for motion capture within a fixed coordinated system 130 according to a possible implementation of the present disclosure. As shown, UWB tags 1, 2, 3, 4, 5, and 6 (i.e., a first portion) are affixed to points at locations on a person 110, while UWB tags 7 and 8 (i.e., a second portion) are affixed to points on a golf club 120 held by the person. Accordingly, a body as described herein may include a singular entity (e.g., object, person, etc.) or multiple entities (e.g., object/object, object/person, person/person, etc.). For example, person 110 and golf club 120 may be considered a signal body or may be considered as two separate bodies.

The UWB tags may be affixed to a body based on any mechanical (e.g., clip), electromagnetic (e.g., magnetic), and/or chemical (e.g., adhesive) coupling mechanism. A UWB tag may be sized/shaped/weighted so that the motion of the body is not impeded. For example, a UWB tag may be implemented as a disk that is approximately 1 inch in diameter, approximately 0.25 inch in height, and weighs less than 0.5 ounces.

The UWB tags coupled to the body may have similar or different characteristics. For example, some UWB tags in the UWB tags coupled to the body may be unitary (e.g., a stand-alone tag) while other UWB tags in the UWB tags may be integrated with a device or article used/worn by the person 110. For example, a UWB tag may be included in a listening device (e.g., hearing aid, earbud, earphones etc.), in glasses (e.g., AR glasses), or any other head-mounted electronic device (e.g., VR headset). A UWB tag may be integrated with a mobile computing device (e.g., mobile phone) carried by a user. A UWB tag may also be included with an article worn by the person. For example, a UWB tag may be affixed or otherwise integrated with a piece of jewelry (e.g., ring bracelet, armband) or a piece of clothing (e.g., headband, wristband, shoes, etc.).

Figure 2:
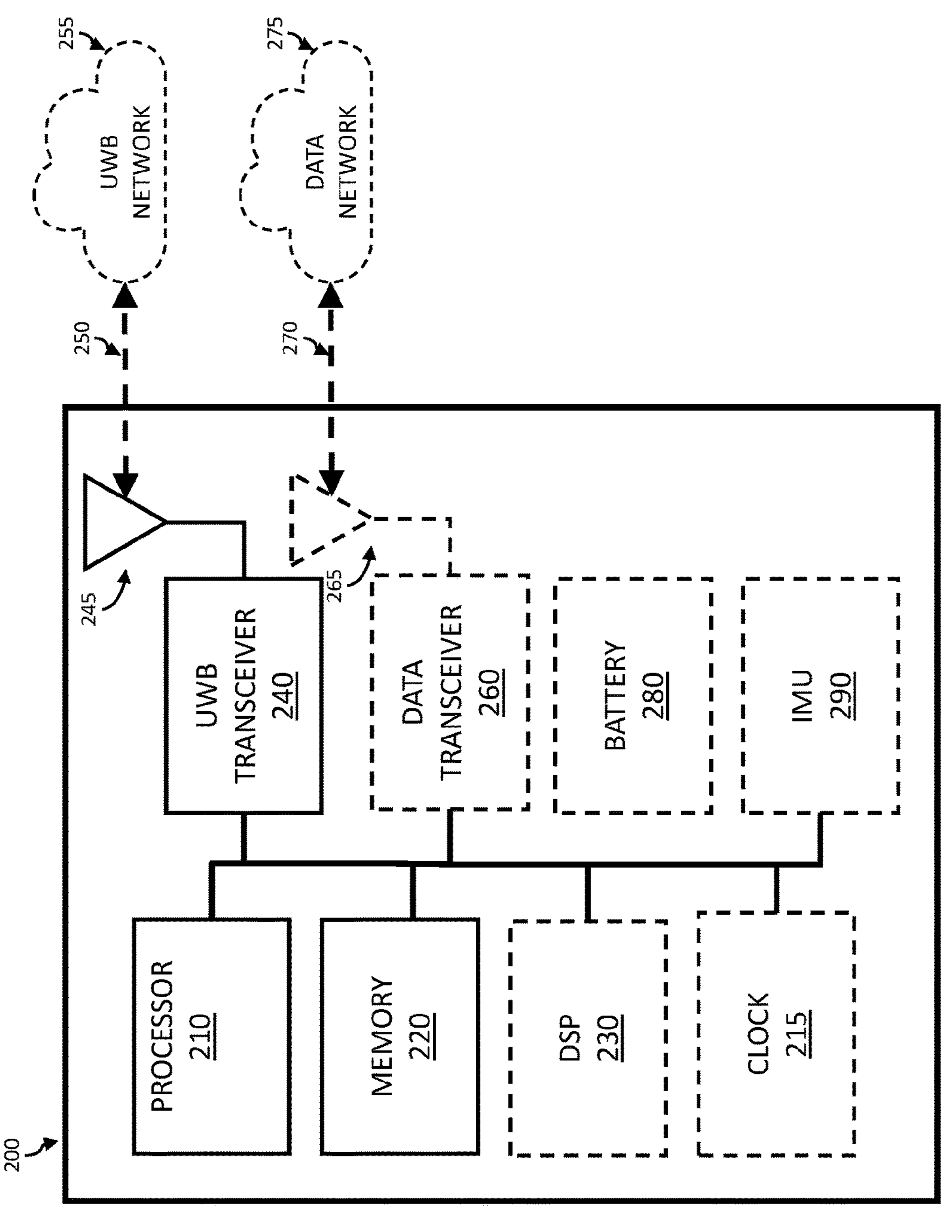
FIG. 2 is a block diagram of an ultra-wideband tag according to a possible implementation of the present disclosure.

FIG. 2 is a block diagram of a UWB tag according to a possible implementation of the present disclosure. The UWB tag 200 can include a processor 210. The processor 210 may be configured to perform operations (e.g., included in the disclosed methods) according to software instructions. The software instructions (i.e., software, code, etc.) may be stored on, and retrievable from, a memory 220) (e.g., a non-transitory computer readable memory). The processor 210 may be communicatively coupled to the memory 220 and configured to retrieve the software for execution and to read/write information resulting from the execution of the software. For example, data regarding round-trip times may be stored on (and retrieved from) the memory 220. For non-unitary implementations, in which the UWB tag 200 is integrated with a multi-purpose electronic device, the processor 210 may be implemented as a central processing unit (CPU) of the multi-purpose device. For example, components configured to provide a UWB tag function in AR glasses may utilize a central processing unit of the AR glasses.

The UWB tag 200 may further include a clock 215 implemented in hardware (e.g., logic circuits) or software (e.g., cycle counter). The clock 215 may control the timing of the digital processing and can serve as a timestamp, which may be useful for computing timing (e.g., a period, an interval) of events. The events may correspond to communication of the UWB tag 200 (e.g., round-trip times), or other events associated with the handshake protocol.

The UWB tag 200 may further include a digital signal processor (DSP 230) that is configured to aid or replace the processor for certain functions. For example, the DSP may be configured to carry out aspects regarding the communication (e.g., packet formation, signal identification, etc.) between UWB tags. The processor 210 and/or the DSP 230 may configure a UWB transmitter/receiver (i.e., UWB transceiver 240) to communicate signals over a UWB communication link 250 via a UWB antenna 245. The signals may correspond to a UWB protocol, which can include a handshake operation (i.e., handshake protocol). The UWB communication link 250 may serve as a communication channel for a UWB network 255 that includes multiple UWB tags. In some implementations, processing may be shared by the multiple UWB tags. In these implementations, the UWB communication link 250 may serve to relay partially processed information between the UWB tags.

The UWB tag 200 may further include a data transceiver 260 (e.g., Bluetooth transceiver, WiFi transceiver, 5G transceiver, etc.) that can be configured by the processor 210 and/or DSP 230 to communicate signals over a data communication link 270 via a data antenna 265. The data communication link 270 may serve as a communication channel for a data network other than the UWB network. For example, the data communication link 270) may be a Bluetooth communication link configured to allow one or more UWB tags in a UWB network 255 to communicate with a mobile computing device via Bluetooth communication. In other words, one or more of the UWB tags may be part of (i.e., communicating with) a data network 275 (e.g., WiFi network, CDMA network, Bluetooth network) in addition to being part of (i.e., communicating with) a UWB network 255. This additional data communication link 270 may be thought of as a port for another device (e.g., AR device, VR device, mobile phone, tablet, etc.) to communicate with the UWB tag 200. This port may be useful in implementations where the other device is configured to perform a portion of the processing necessary for motion capture or in implementations where the other device is configured to receive the result of the motion capture (e.g., for an AR application, for a VR application, etc.).

The UWB tag 200 may further include an inertial measurement unit (IMU). The IMU 290 may include one or more accelerometers and magnetometers configured to measure movement and orientation of the UWB tag 200. The movement and orientation information provided by the IMU 290 may be useful for processing motion capture data from the UWB tags. For example, information from the IMU may help to establish a fixed coordinate system (i.e., coordinate system 130) to which the relative positions of the UWB tags may be mapped. For non-unitary implementations, in which the UWB tag 200 is integrated with a multi-purpose electronic device, the IMU 290 may be an IMU of the multi-purpose electronic device.

The UWB tag 200 may further include a power source, such as a battery 280 (e.g. rechargeable battery), to electrically energize the components for function. For non-unitary implementation, in which the UWB tag 200 is integrated within an electronic device, the battery may be a battery for the device. For example, components to provide a UWB tag function in AR glasses may be powered by the battery of the AR glasses rather than a battery dedicated to a UWB tag.

FIG. 3 is a flowchart of a method for motion capture according to a possible implementation of the present disclosure. The method 300 includes coupling 310 UWB tags to a body. A count (i.e., number) of the UWB tags and their placement at points on the body may be based on a movement to be captured. For example, a plurality of UWB tags (i.e., UWB tags) can be coupled at joints of a person in order to capture a movement of a limb. For example, a first UWB tag can be coupled at (e.g., coupled to) a left wrist of the person and a second UWB tag can be coupled at (e.g., coupled to) a left elbow of the person to capture a forearm movement of the person.

The method 300 further includes constructing 400 (e.g., over a plurality of handshake iterations) a Euclidean distance matrix based on round-trip times between pairs of the UWB tags coupled (i.e., affixed) to points on a body. The use of a Euclidean distance matrix can facilitate easy checks of the underlying hardware, which can have the technical effect of providing quicker and easier motion capture.

Figure 4:
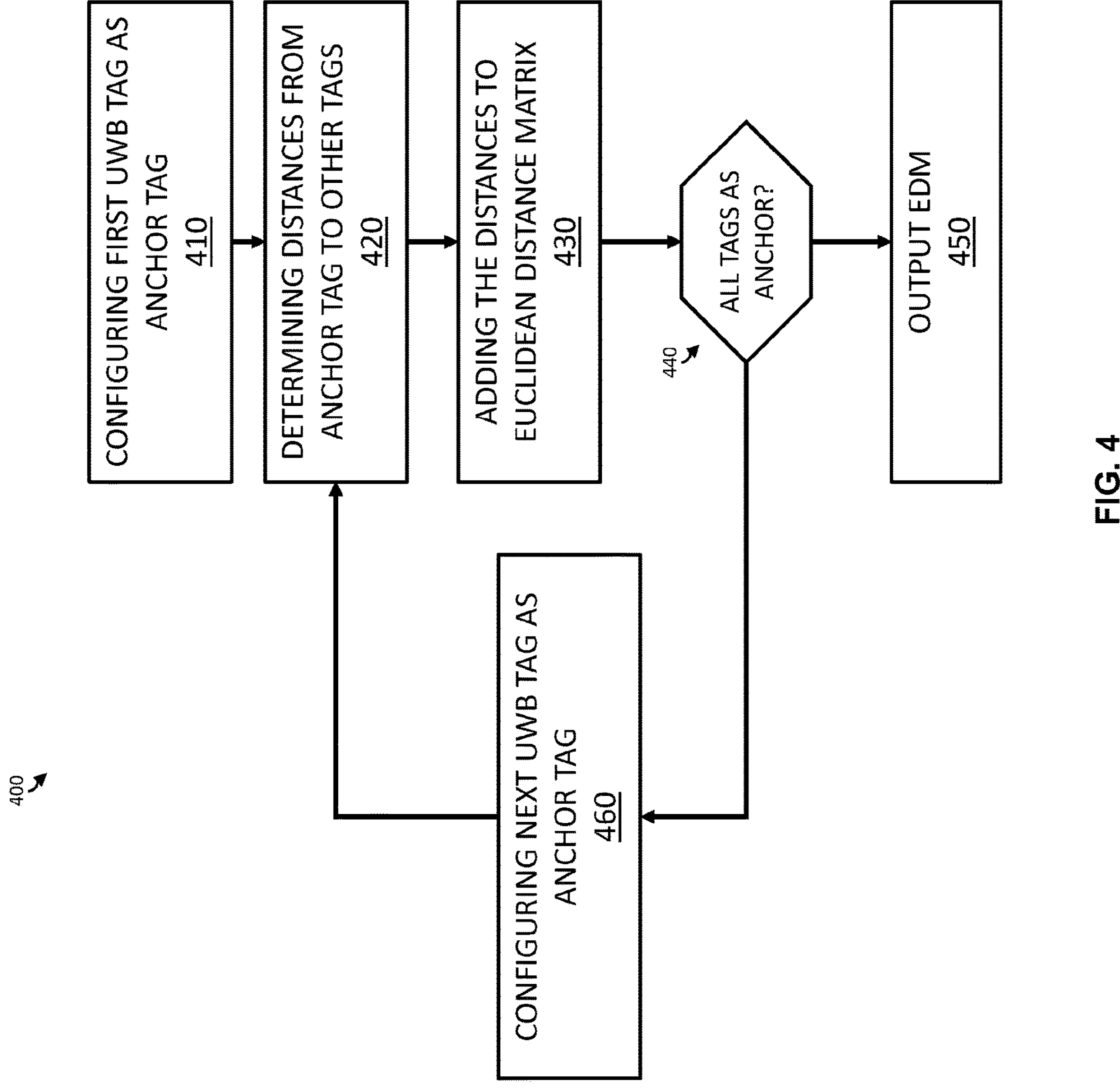
FIG. 4 is a flowchart of a possible method for constructing a Euclidean distance matrix for the method for motion capture of FIG. 3.

FIG. 4 is a flowchart of a possible method for constructing a Euclidean distance matrix (EDM). The method for constructing 400 an EDM includes successively configuring each UWB tag as an anchor tag. In other words, a UWB tag may be configured in at least two modes. In a first mode, a UWB tag may function as an anchor tag, while in a second mode, the UWB tag may function as a receiver tag. The UWB network may include a plurality of UWB tags. At any given time, the UWB tags may include one UWB tag configured as an anchor tag, while the rest of the UWB tags are configured as receiver tags. When configured as an anchor tag, the UWB tag may initiate a communication (e.g., a handshake protocol) in the UWB network and when configured as a receiver tag the UWB tag may receive and respond to communication (e.g., a handshake protocol) in the UWB network.

The method for constructing 400 an EDM can include configuring 410 a first UWB tag of the plurality of UWB tags coupled to a body as the anchor tag. The choice of which UWB tag to operate as the anchor tag first may be determined differently in various implementations. For example, the choice of the first anchor tag of the plurality of UWB tags may be part of a predetermined sequence of assignment. Alternatively, the choice may be based on a timing of a request transmitted by a UWB tag. In other words, a first anchor tag may be assigned to a UWB tag that requests the role first. The method further includes determining 420 distances between the anchor tag and one or more, optionally each, of the other tags (i.e., the receiver tags). The distances may be determined based on timing associated with a handshake protocol.

The term "distance" as used herein represents the relative position between each pair of tags. However, it will be understood that, in some examples, each UWB tag can use multiple antennas to perform a beam forming operation (optionally using time of arrival calculations at each antenna) to determine an angle between the pair of tags. In such examples, a directionality can be determined which includes both the distance and an angle. Directionality is not required to perform the disclosed approach to motion capture, and the ability to use UWB tags with a single antenna can facilitate provision of a cheaper and more scalable approach. However, in some use cases directionality may be of interest, since it can help to further improve accuracy of the motion capture.

Figure 5:
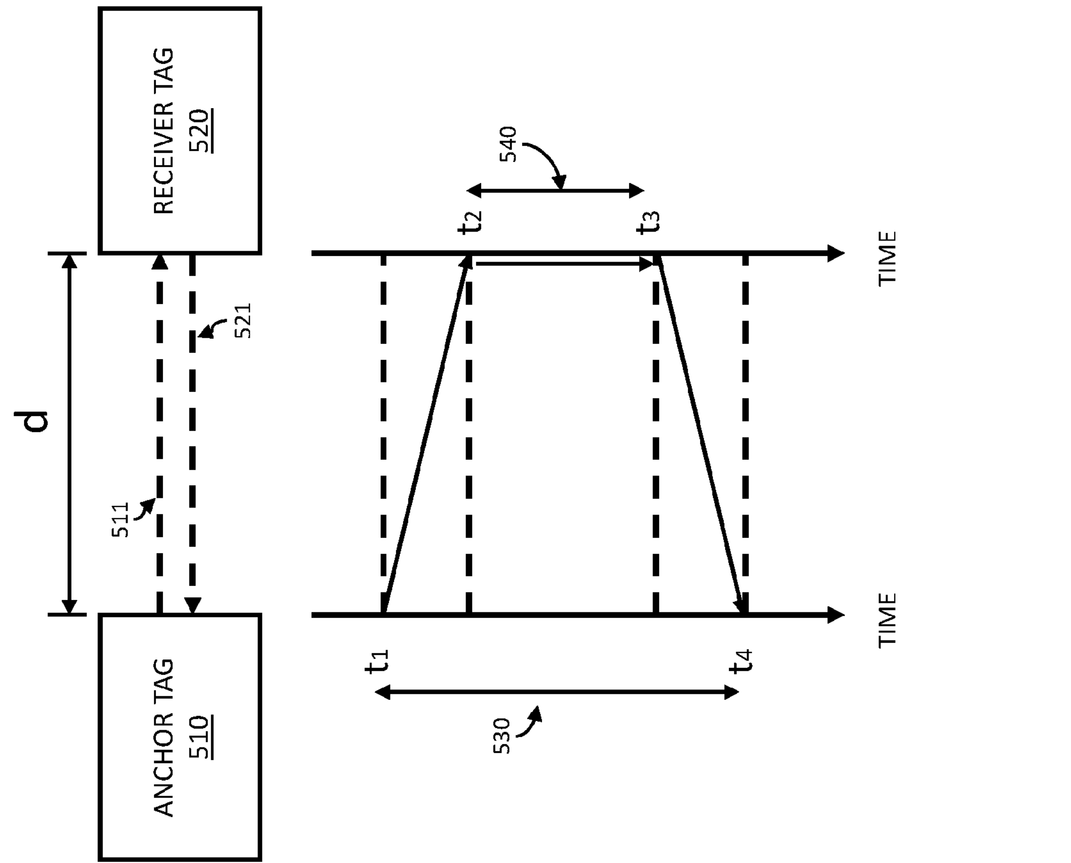
FIG. 5 graphically illustrates a handshake protocol for determining a distance between ultra-wideband tags according to a possible implementation of the present disclosure.

FIG. 5 graphically illustrates a handshake protocol according to a possible implementation of the present disclosure. In a handshake protocol, an anchor tag 510 and a receiver tag 520 exchange handshake signals. As shown, the anchor tag 510 transmits a handshake-prompt signal 511 (i.e., ping) to a receiver tag 520 at a first time ($t_1$). The handshake-prompt signal 511 has a propagation delay so the receiver tag 520 receives the handshake-prompt signal 511 at a second time ($t_2$) that is after the first time ($t_1$). Upon receiving the handshake-prompt signal, the receiver tag 520 is triggered to respond by transmitting the handshake-reply signal back to the anchor tag 510. A handshake-reply process at the receiver tag may have a latency so the receiver tag 520 transmits a handshake-reply signal 521 at a third time ($t_3$) that is after the second time ($t_2$). The handshake-reply signal 521 has a propagation delay so the anchor tag 510 receives the handshake-prompt signal 511 at a fourth time ($t_4$) that is after the third time ($t_3$).

A round-trip time 530 (RTT) of the handshake communication can be computed at the anchor tag as the difference between the fourth time and the first time (i.e., $RTT=t_4-t_1$). The distance (d) between the anchor tag 510 and the receiver tag 520 may be computed based on the propagation delay of the handshake-prompt signal 511 and/or the handshake-reply signal 521, as shown in the equation below, wherein c is the propagation speed of the signals.

$$d = c\cdot(t_2 - t_1) = c\cdot(t_4 - t_3) \tag{1}$$

The total propagation delay (i.e., $PD=(t_2-t_1)+(t_4-t_3)$) may be computed by subtracting the latency 540 (L) of the receiver tag 520 from the round-trip time (i.e., PD=RTT−L). By controlling the latency 540 (L) to be a predetermined duration (i.e., known by the anchor tag), the calculation of the distance (d) can be based entirely on the round-trip time (RTT) measured by the anchor tag 510, as shown in the equation below.

$$d = c\cdot\frac{(RTT - L)}{2} \tag{2}$$

Returning to FIG. 4, the anchor tag may execute a handshake with each receiver tag, in succession, to measure a plurality of relative distances that can be added 430 to a Euclidean distance matrix (EDM). The EDM can include elements corresponding to all pairwise distances in the UWB network. Accordingly, after the anchor tag has measured all distances to receiver tags, a new UWB tag (i.e., next UWB tag) may be configured 460 as the anchor tag and the distance measurement process may be repeated until it is determined 440 that all of the UWB tags have been configured as the anchor tag. After all of the UWB tags have measured distances and added the distances to the EDM, the EDM may be output 450. A choice of the next UWB tag may be made based on a predetermined sequence or based on a timing of a request. The complete EDM can be output by one of the UWB tags, or elements of the EDM can be output from each UWB tag and the EDM can then be generated and output separately based on these elements.

Figure 6:
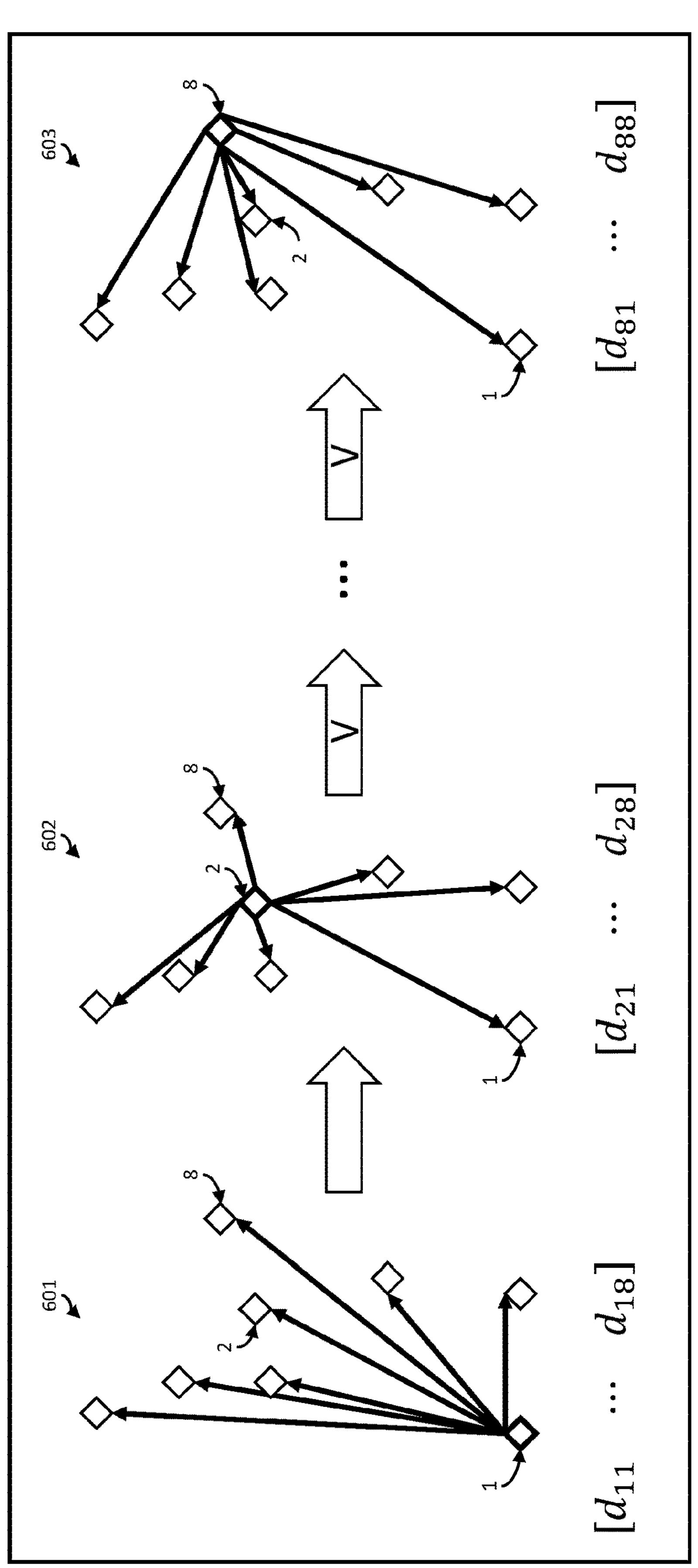
FIG. 6 graphically illustrates determining distances between anchor tags and other ultra-wideband tags according to a possible implementation of the present disclosure.

FIG. 6 graphically illustrates determining distances between anchor tags and receiver tags for the UWB tag configuration shown in FIG. 1. At a first example iteration 601, a first UWB tag 1 is configured as the anchor tag to measure RTTs and compute pairwise distances ($d_{11}$, $d_{12}$, . . . $d_{18}$), where $d_{12}$ corresponds to a measured distance from UWB tag 1 to UWB tag 2, $d_{13}$ corresponds to a measured distance from UWB tag 1 to UWB tag 3, and so on. After the pairwise distances (i.e., from UWB tag 1) are measured, they can be added to the EDM.

At a second example iteration 602, a second UWB tag 2 is configured as the anchor tag to measure RTTs and compute pairwise distances ($d_{21}$, $d_{22}$, . . . $d_{28}$), where $d_{21}$ corresponds to a measured distance from UWB tag 2 to UWB tag 1, $d_{28}$ corresponds to a measured distance from UWB tag 2 to UWB tag 8, and so on. After the pairwise distances (i.e., from UWB tag 2) are measured, they can be added to the EDM.

The process may continue until an iteration 603 in which the UWB tag 8 (i.e., an eighth iteration) is configured as the anchor tag to measure RTTs and compute pairwise distances ($d_{81}$, $d_{82}$, . . . das). Here, $d_{81}$ corresponds to a measured distance from UWB tag 8 to UWB tag 1, $d_{82}$ corresponds to a measured distance from UWB tag 8 to UWB tag 2, and so on. After the pairwise distances (i.e., from UWB tag 8) are measured, they can be added to the EDM. In other words, the Euclidean distance matrix may be constructed (i.e., computed) iteratively by successively configuring (i.e., designating) each UWB tag as an anchor tag, determining distances between the designated anchor tag and the other UWB tags (i.e., configured as receiver tags), and updating the EDM with the determined distances. This process may continue until each UWB tag has been configured as the anchor tag. For example, a designated sequence of handshakes may be carried out so that upon completion of the last handshake, the EDM may be designated as complete for a pose of the motion capture. After the EDM is completed it can be checked for validity based on some required or preferred characteristics.

Figure 7:
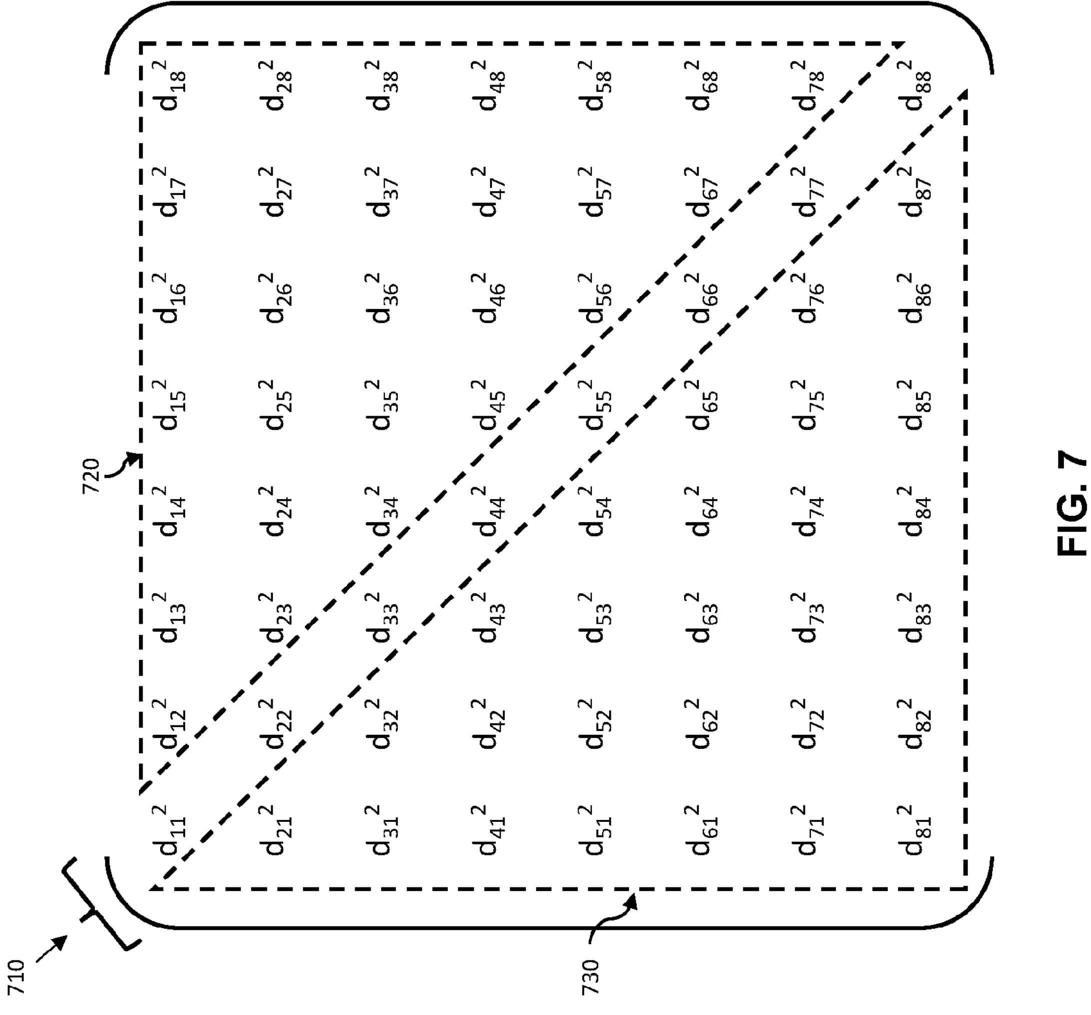
FIG. 7 illustrates a Euclidean distance matrix according to a possible implementation of the present disclosure.

FIG. 7 illustrates an example of an EDM according to a possible implementation of the present disclosure. The example EDM includes elements having values that correspond to pairwise distances between the UWB tags (1, 2, 3, 4, 5, 6, 7, 8), as described above. In particular, each element of the EDM may be a squared distance (e.g., $(d_{11})^2$, $(d_{12})^2$, etc.). The EDM 700 is arranged in rows according to anchor tags in and columns according to receiver tags, though in other implementations, a converse row-column arrangement could be used. Each element of the EDM 700 corresponds to a computed distance between a particular anchor tag and a particular receiver tag. Because the EDM may include squared distances the values of all elements may be expected to be non-negative. The values of some of the elements (i.e. distances) can have an expected value or characteristic. For example, diagonal elements 710 may be expected to be zero, as each corresponds to a distance between a UWB tag and itself. The other elements of the EDM 700 (i.e., off-diagonal elements) may have symmetric counterparts. For example, each element of a first off-diagonal group 720 may have a corresponding element in a second off-diagonal group 730 that is expected to be the same value. For example, a first distance $d_{12}$ may be expected to equal a second distance $d_{21}$ because exchanging a starting point and an ending point of a distance measurement should have no effect.

Other values or conditions may be imposed by the application. For example, motion capture of a human may place constraints on a minimum expected separation between UWB tags. Alternatively, a pulse width of the UWB protocol may place constraints on a minimum expected separation. Accordingly, in some implementations it is expected that off-diagonal elements in the first off-diagonal group 720 and the second off-diagonal group 730 may be expected to be above a minimum distance. Based on these values, conditions, and/or assumptions, a validity of the EDM may be checked.

A distance measurement using a RTT of a UWB communication may experience noise or interference (e.g., multipath) that can cause errors in the determined distances. Accordingly, a method 300 for motion capture (see FIG. 3) may include a method 800 (i.e., process) for checking a validity of the EDM. As shown in FIG. 3, the method 300 may alternatively 320 reconstruct 900 a skeletal topology when an EDM is valid (i.e., includes no, or insignificant errors) or may repeat constructing 400 the EDM when the EDM is invalid (e.g., includes significant errors). In other words, an invalid EDM may be discarded based on a validity determination (i.e., measurement).

Figure 8:
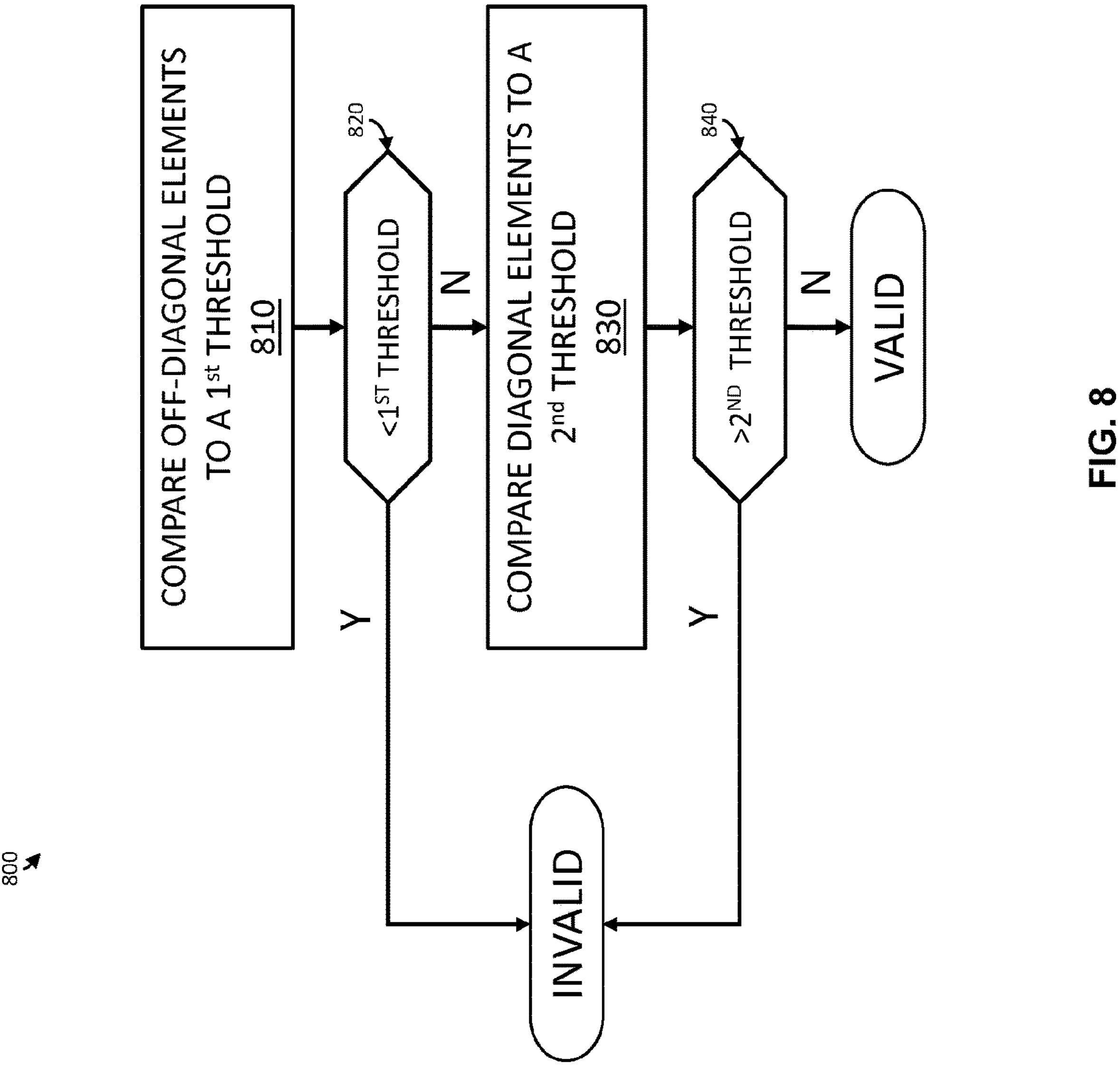
FIG. 8 is a flowchart of a possible method for checking the validity of a Euclidean distance matrix for the method for motion capture of FIG. 3.

FIG. 8 is a flowchart of a possible method for checking the validity of an EDM. The method 800 includes comparing 810 off-diagonal elements to a first threshold. As discussed, the off-diagonal elements may be expected to have a value corresponding to at least a minimum required distance (e.g., for motion capture, for a pulse width). Accordingly, a first threshold may be set (e.g., $V_{t1}=d_{min}^2$) to a predetermined small value (i.e., small for an off-diagonal element), and each off-diagonal element may be compared 820 to the first threshold. If the comparison results in one or more of the off-diagonal elements that are below the first threshold, then the EDM may be determined to be invalid. Alternatively, if the off-diagonal elements are determined to be above the first threshold, then the EDM may be determined to be valid. Variations to this comparison and the criterion for validity may exist and are within the scope of the disclosure.

The method 800 can further include comparing 830 diagonal elements 710 to a second threshold. As discussed, the on-diagonal (i.e., diagonal) elements of the EDM may be expected to have a small (e.g., zero) value. Accordingly, a second threshold may be set (e.g., $V_{t2}=d_{max}^2$) to a large value (i.e., large for an on-diagonal element), and each diagonal element may be compared 840) to the second threshold. If the comparison results in one or more of the diagonal elements that are above the second threshold, then the EDM may be determined to be invalid. Alternatively, if the diagonal elements are determined to be at, or below; the second threshold, then the EDM may be determined to be valid. Variations to this comparison and the criterion for validity may exist and are within the scope of the disclosure.

Returning to FIG. 3, the method 300 for motion capture further includes reconstructing 900 a skeletal topology based on a valid EDM. In other words, based on the pairwise distances and knowledge of the relative locations of the UWB tags on a body, a digital skeleton representing a pose of the body may be reconstructed. The skeletal topology can include a number of nodes corresponding to the number of UWB tags and can further include edges that link nodes. The edges may correspond to (or be based on) the knowledge of the relative location of the UWB tags on the body. For example, nodes which are located at joints of a human limb may be connected with edges in a particular manner.

Figure 9:
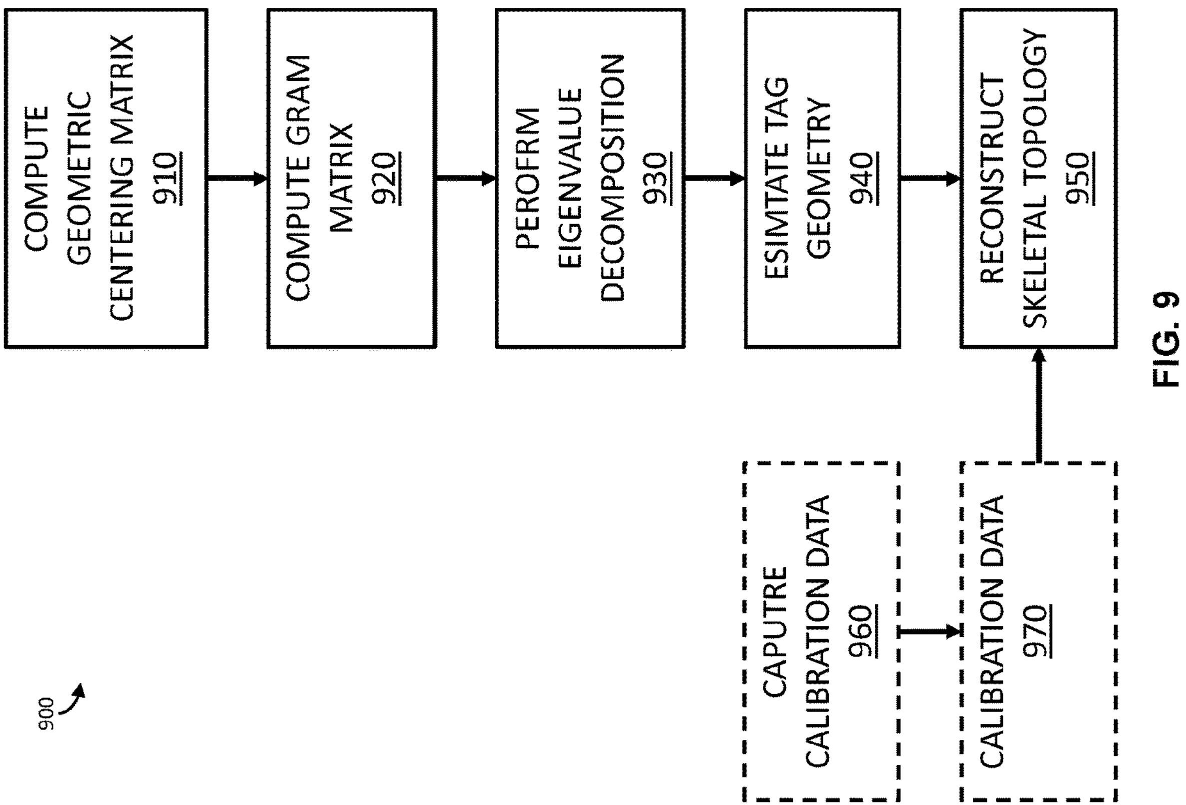
FIG. 9 is a flow chart of a possible method of reconstructing a skeletal topology for the method for motion capture of FIG. 3.

FIG. 9 is a flow chart of a possible method of reconstructing a skeletal topology for motion capture. The method 900 receives a valid EDM and includes computing 910 a geometric centering matrix (C), which can be an N×N matrix, where N is a number of nodes in the skeletal topology.

$$C = I - \frac{1}{n}11^T \tag{3}$$

The method 900 further includes computing 920 a gram matrix (G). The Gram matrix has an (i,j)-th entry that is an inner product of UWB coordinates (i) and UWB coordinates (j) where i and j are an index of the UWB tags. The Gram matrix can be computed by multiplying the centering matrix (C) to each side of the EDM matrix (EDM). Both the EDM and the centering matrix have a size (e.g., N×N), which implies that the Gram matrix, which contains inner products of coordinates, will also be the size (e.g., N×N).

$$C = -0.5CEDM(T)C \tag{4}$$

The method 900 further includes performing 930 an eigenvalue decomposition on the Gram matrix. The Gram matrix can also be expressed as XTX, where X is a d×N matrix with d being the dimensions of the coordinate system (e.g., x, y, z implies d=3) that describe the absolute locations of the UWB tags. With a goal of reconstructing X as the final topology, solving for X out of $G=X^T X$ can be achieved through eigenvalue decomposition (EVD), where knowledge of G is in a lower dimensional subspace and the top-d eigenvalues and/or eigenvectors describe the lower dimensional subspace.

$$U, [\lambda_i]_{i=1}^{n} = EVD(G) \tag{5}$$

The method 900 further includes estimating 940 the UWB tag geometry, which is described as a 3×N matrix with each row describing the absolute coordinates of one of the UWB tags in the coordinate system 130.

$$T_{UWB} = \left[\mathrm{diag}\left(\sqrt{\lambda_1}, \ldots \sqrt{\lambda_d}\right), 0_{dx(N-d)}\right]U^T \tag{6}$$

The method 900 further includes reconstructing 950 a skeletal topology corresponding to a pose of the body from the locations of the UWB tags (i.e., the tag geometry). Calibration data 970 may improve the accuracy of this reconstruction 950. For example, calibration data 970 can help to determine a correct solution when multiple solutions result from the reconstruction process. Calibration data may also help to infer information about the body to help connect UWB tag locations (i.e., nodes) in the skeletal topology. In other words, the calibration data 970 may help to determine edges in the skeletal topology. The calibration data may be acquired (i.e., captured 960) before the motion capture. For example, the calibration may be captured 960 once for a motion capture setup prior to the motion capture.

Calibration data 970 may include information about the physical setup of the UWB tags and/or the coordinate system 130 of the motion capture system. For example, the calibration data can correspond to a topology of the UWB tags in a fixed coordinate system. The calibration data 970 can include identification information of each UWB tag and location information relative to the body. For example, calibration data may include a table having UWB tags IDs (e.g., Tag1, Tag2, etc.) and their corresponding (i.e., correlated) body location (e.g., left wrist, right ankle, etc.). In this implementation, capturing 960 the motion data can include a user entering information regarding each tag and its location on a body. Calibration data 970 may also be captured by a sensing device, such as an inertial measurement unit or a camera. In a possible implementation, capturing the calibration data (i.e., calibration information) may additionally or alternatively include capturing orientation data of a UWB tag using an inertial measurement unit (IMU). The IMU may be integrated with a UWB tag or with a mobile computing device (e.g., AR glasses) including or functioning as a UWB tag. The IMU may be in a device that may be in the UWB network 255 and/or the data network 275. In another possible implementation, capturing the calibration data may additionally or alternatively include capturing visual information about the UWB tag and/or the body using a camera. The camera may be included in a mobile computing device that may be part of the UWB network 255 and/or the data network 275.

Returning to FIG. 3 the method for motion capture may repeat the three-step process of constructing 400 (i.e., computing) an EDM, checking 800 the fidelity (i.e., validity) of the EDM, and reconstructing 900 a skeletal topology based on the EDM at intervals to collect a plurality (i.e, collection, set) of skeletal topologies 330. In other words, a set of skeletal topologies can be generated from a plurality of Euclidean distance matrices generated at intervals (e.g., regular intervals) in time. In this way, motion of the body through space and time may be captured.

Figure 10:
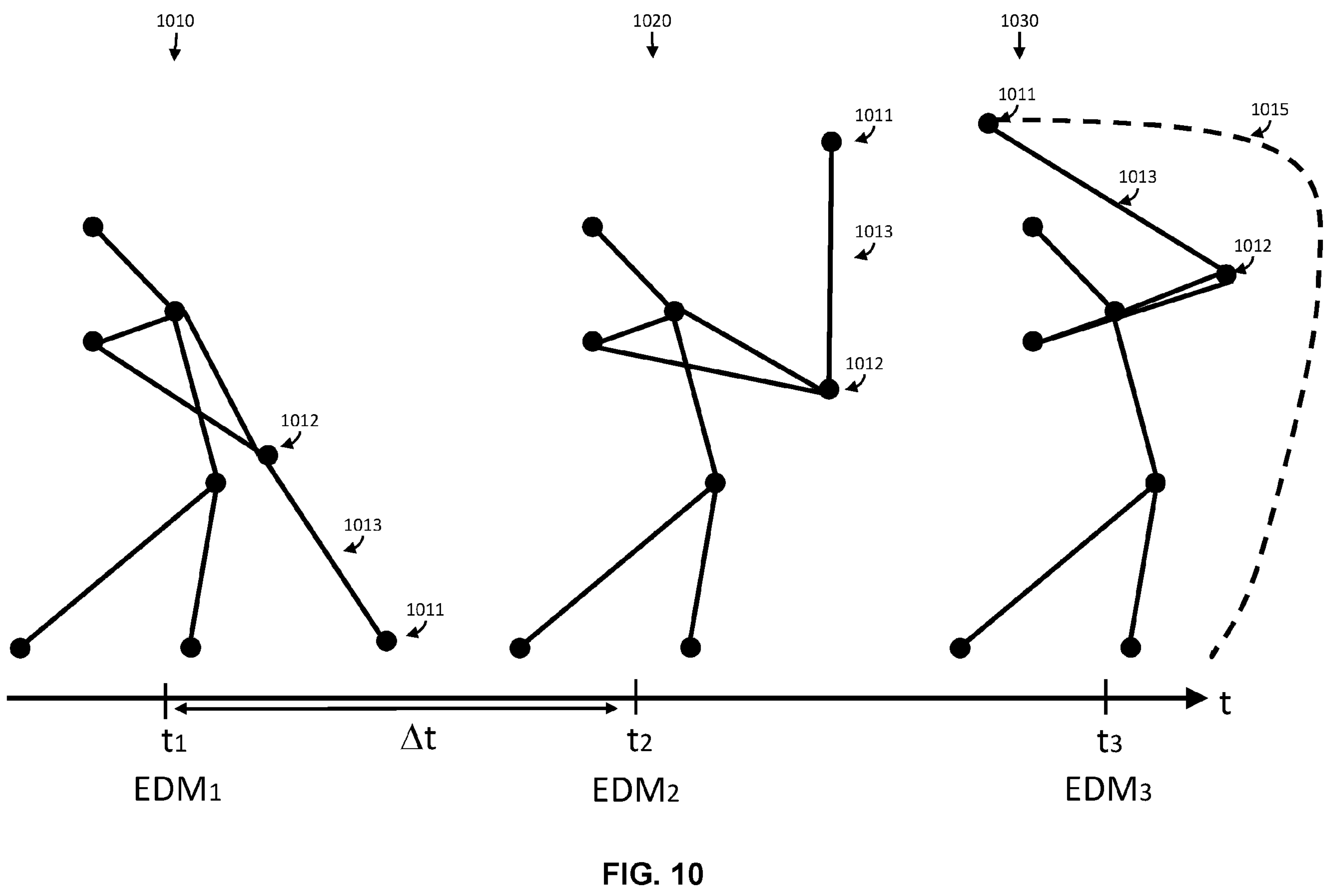
FIG. 10 is a collection of skeletal topologies reconstructed according to an implementation of the present disclosure.

FIG. 10 is a collection (i.e., set) of skeletal topologies reconstructed according to an implementation of the present disclosure. Each skeletal topology corresponds to a pose of a body at a different point in time. For example, the skeletal topologies shown in FIG. 10 may correspond to a person swinging a golf club, such as shown in FIG. 1. In other words, each skeletal topology corresponds to a pose of the user at a time, and the skeletal topologies are arranged in order so that the poses correspond to a captured motion 340 of the body. As shown in FIG. 10, a first skeletal topology 1010 corresponds to a first EDM ($EDM_1$) computed at a first time ($t_1$), a second skeletal topology 1020 corresponds to a second EDM ($EDM_2$) computed at a second time (12), and a third skeletal topology 1030 corresponds to a third EDM ($EDM_3$) computed at a third time ($t_3$). The first time, second time and third time occur in succession and may be separated by an interval (e.g., regular interval) At. The interval can be shorter than the rate of a motion to be captured. In some examples, the intervals may be irregular.

In the example illustrated by FIG. 10, the set of skeletal topologies corresponds to a user swinging a golf club. Each skeletal topology includes nodes coupled by edges. The edges may be based on calibration data that includes spatial relationships between the UWB tags and points on the body. As shown, a first node 1011, a second node 1012, and a first edge 1013 may correspond to the golf club 120 shown in FIG. 1. The golf club changes pose at each time of the motion capture, and by analyzing a node (or nodes) and/or an edge (or edges), a motion 1015 of the body (golf club 120) can be captured.

The set of skeletal topologies may be transmitted to a motion-capture application (e.g., running on a mobile computing device). The motion-capture application (i.e., application) may receive the skeletal topologies in real time (e.g., relative to a speed of motion) so that an application (e.g. AR application) can respond according to the movements as they occur. In other words, the motion of the body may be captured in real time and transmitted to an AR application. Alternatively, the skeletal topologies may be stored and recalled by the motion-capture application after they occur. The application may be configured to determine a motion of the body. For example, as shown in FIG. 10, a movement 1015 of the golf club can be determined by connecting the relative positions of the first node 1011 in each of the skeletal topologies. The application may be configured to evaluate this movement and generate a response.

A system for motion capture may include a set of UWB tags coupled to one or more bodies. The UWB tags for each body are configurable to take turns performing a handshake protocol and determine an EDM for the body. The system can further include a hub device that is communicatively coupled to one or more of the UWB tags. The hub device may have a processor that can be configured by software to check the validity of the one or more EDMs and (if valid) reconstruct one or more skeletal topologies of the one or more bodies.

Figure 11:
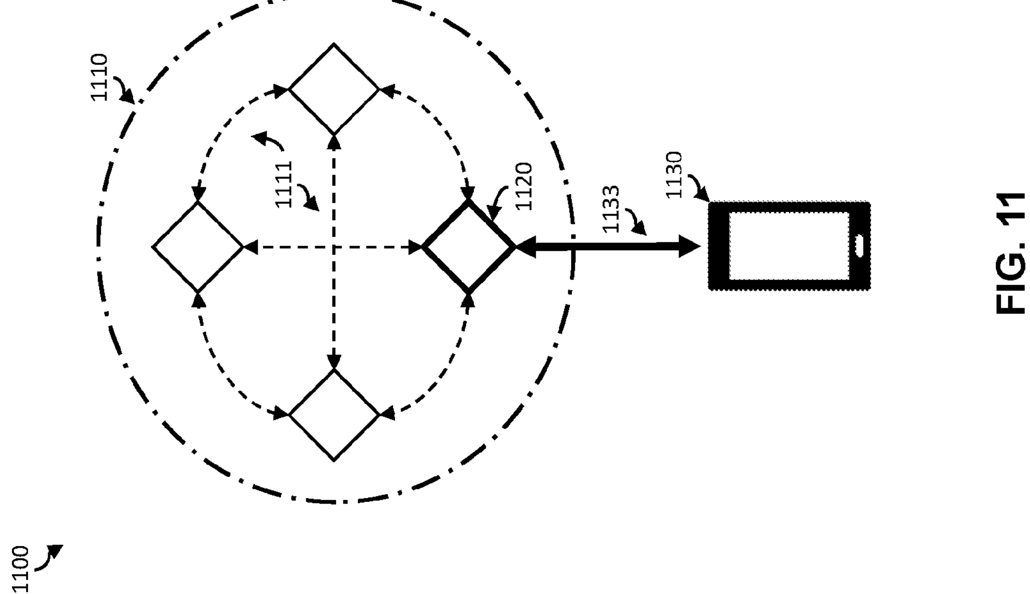
FIG. 11 is a block diagram of a system for motion capture according to a first possible implementation of the present disclosure.

FIG. 11 is a block diagram of a system for motion capture according to a first possible implementation of the present disclosure. The system 1100 includes a set of UWB tags that are communicatively coupled to one another via UWB communication links 1111 (i.e., via ultra-wideband communication). In other words, the set of UWB tags may form a UWB network 1110. The UWB network 1110 may include a UWB tag configured as an anchor tag 1120. The anchor tag 1120 may be configured to control aspects of the processing and/or communication for the other UWB tags in the UWB network 1110. Accordingly, the anchor tag 1120 may have different (e.g., more) processing and/or storage capabilities than the other UWB tags in the UWB network 1110.

The anchor tag 1120 may be communicatively coupled to a hub device 1130 that is not in the UWB network 1110. For example, the anchor tag 1120 may communicate with the hub device 1130 via a Bluetooth communication link 1133 (i.e., via Bluetooth communication). In this implementation, the hub device 1130 may supplement processing for the UWB network 1110. For example, while the anchor tag 1120 may be configured to collect elements of the EDM (e.g., distances) from the UWB tags and construct an EDM, the hub device 1130 may configured to receive the EDM from the anchor tag, check the validity of the EDM, and (when the EDM is valid) reconstruct the skeletal topology based on the EDM.

Figure 12:
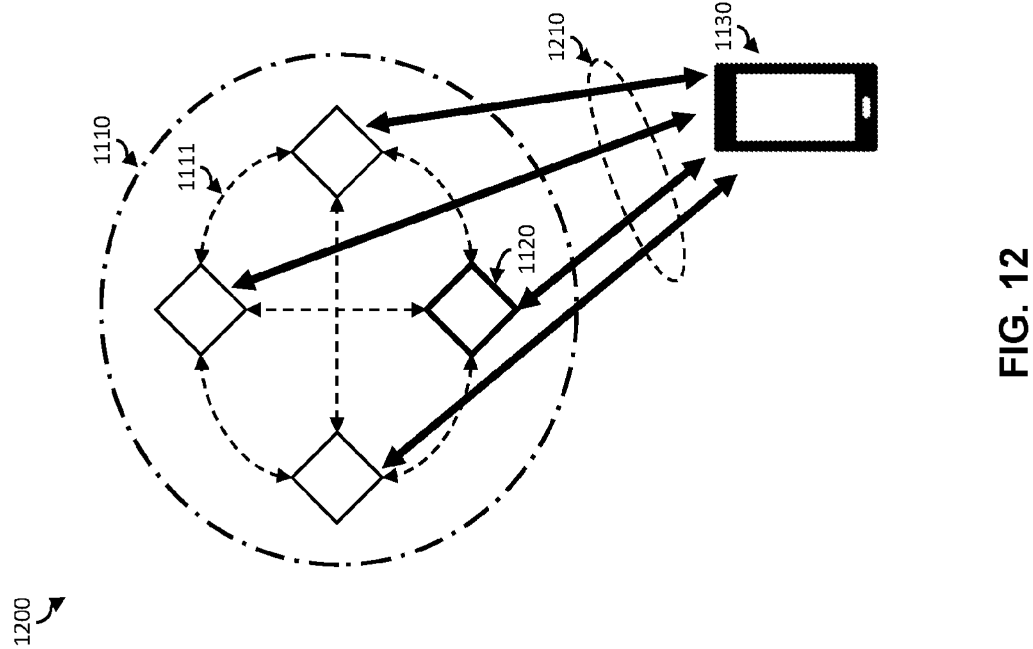
FIG. 12 is a block diagram of a system for motion capture according to a second possible implementation of the present disclosure.

FIG. 12 is a block diagram of a system for motion capture according to a second possible implementation of the present disclosure. The system 1200 includes a set of UWB tags that are communicatively coupled to one another via UWB communication links 1111. In other words, the set of UWB tags may form a UWB network 1110. The UWB network 1110 may include a UWB tag configured as an anchor tag 1120. In the second implementation, each of the UWB tags may include similar (e.g., the same) processing and/or storage capabilities. Accordingly, each UWB tag may be communicatively coupled to a hub device 1130 that is not in the UWB network 1110. For example, each UWB tag may communicate with the hub device 1130 via a Bluetooth communication link 1210. In this implementation, the hub device 1130 may provide processing for the UWB network 1110. For example, the hub device 1130 may be configured to collect (or receive) elements for the EDM (e.g., distances) from each UWB tag and construct an EDM. In other words, the hub device 1130 may be configured to receive handshake results from each tag, compute an EDM, check the validity of the EDM, and (when the EDM is valid) reconstruct the skeletal topology based on the EDM. The EDM can then be output by the hub device 1130.

Figure 13:
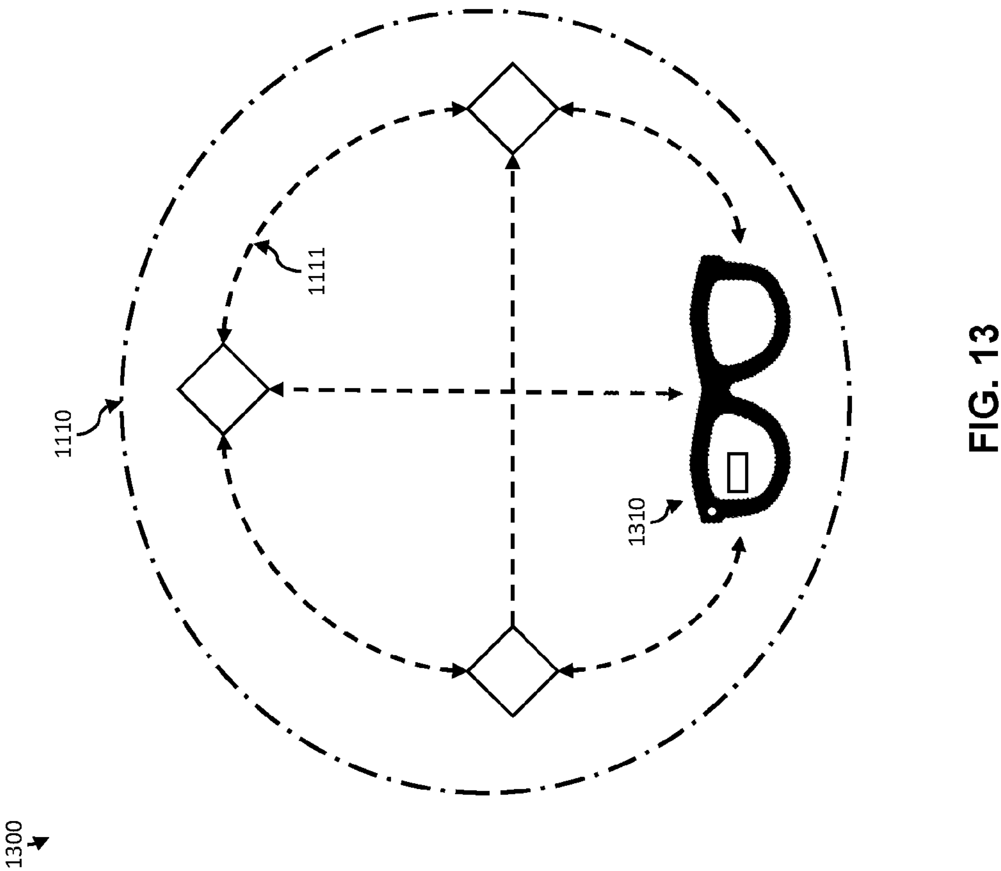
FIG. 13 is a block diagram of a system for motion capture according to a third possible implementation of the present disclosure.

FIG. 13 is a block diagram of a system for motion capture according to a third possible implementation of the present disclosure. The system 1300 includes a set of UWB tags that are communicatively coupled to one another via UWB communication links 1111. In other words, the set of UWB tags may form a UWB network 1110. In the third implementation, a hub device 1310 may be in the UWB network 1110. For example, the hub device 1310 may be a pair of AR glasses that has an integrated UWB tag or can be configured to otherwise operate as a UWB tag. In the third implementation, all communication with the hub device 1310 may be handled via the UWB communication links. The hub device may be configured to provide processing for part or all of the motion captures. For example, the hub device 1310 may be configured to acquire round-trip times between pairs of UWB tags, compute an EDM based on the round-trip times, check a fidelity of the EDM, and reconstruct a skeletal topology. The process may be repeated in real time to capture the motion of a body for an AR application running on the AR glasses. For example, virtual objects presented on a display of the AR glasses may be moved according to the captured motion.

Figure 14:
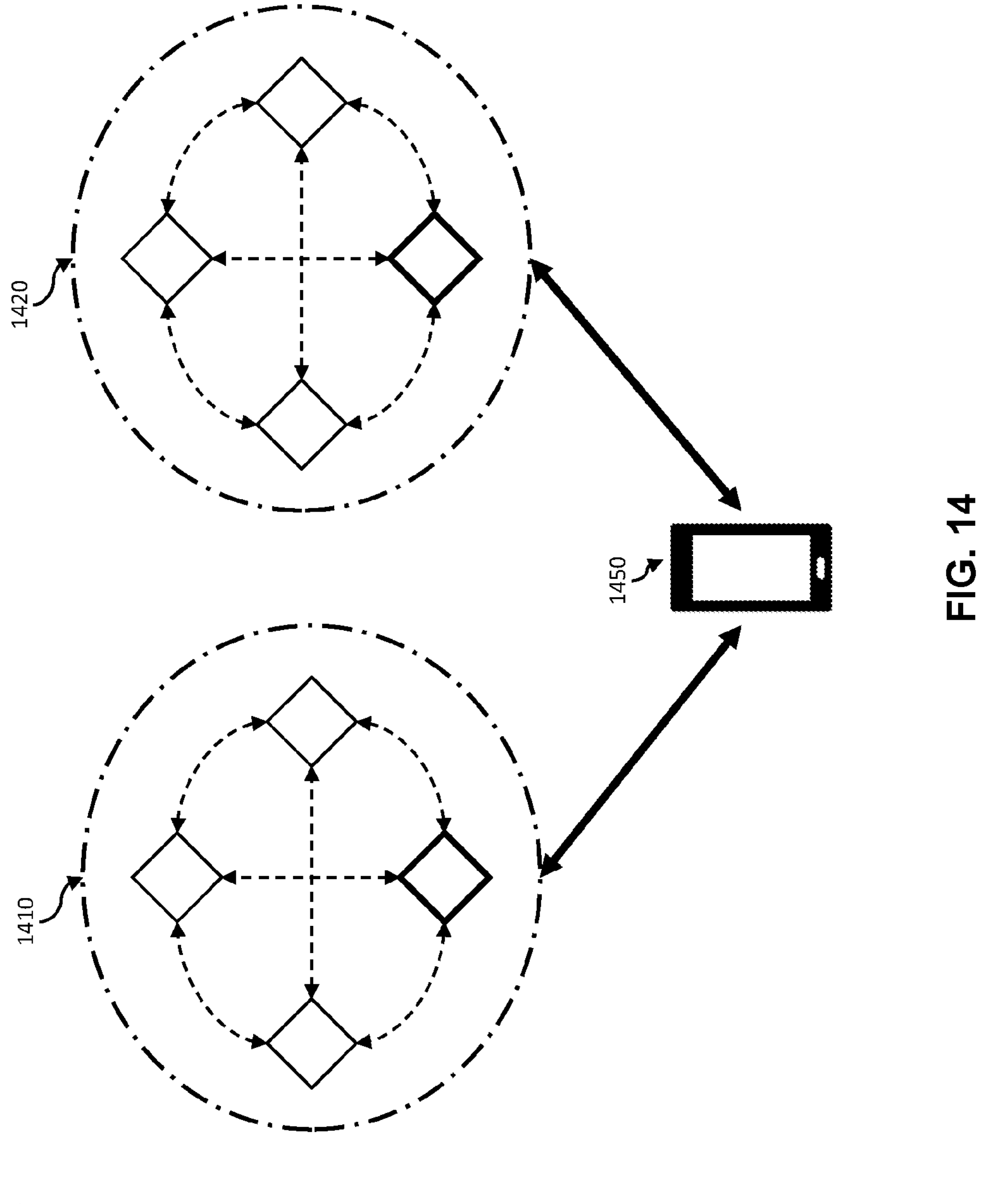
FIG. 14 is a block diagram of a system for motion capture according to a fourth possible implementation of the present disclosure.

FIG. 14 is a block diagram of a system for motion capture according to a fourth possible implementation of the present disclosure. The system 1400 includes a first set of UWB tags that form a first UWB network 1410. The system 1400 further includes a second set of UWB tags that form a second UWB network 1420. In the fourth implementation, a hub device 1450 can communicate with the first set of UWB tags and the second set of UWB tags and can perform processing to capture a first motion of a first body coupled to the first set of UWB tags and capture a second motion of a second body coupled to the second set of UWB tags. The first and second bodies may be linked or otherwise joined (such as the golf club 120 and person 110), or may be configured to move independently of one another.

Figure 15:
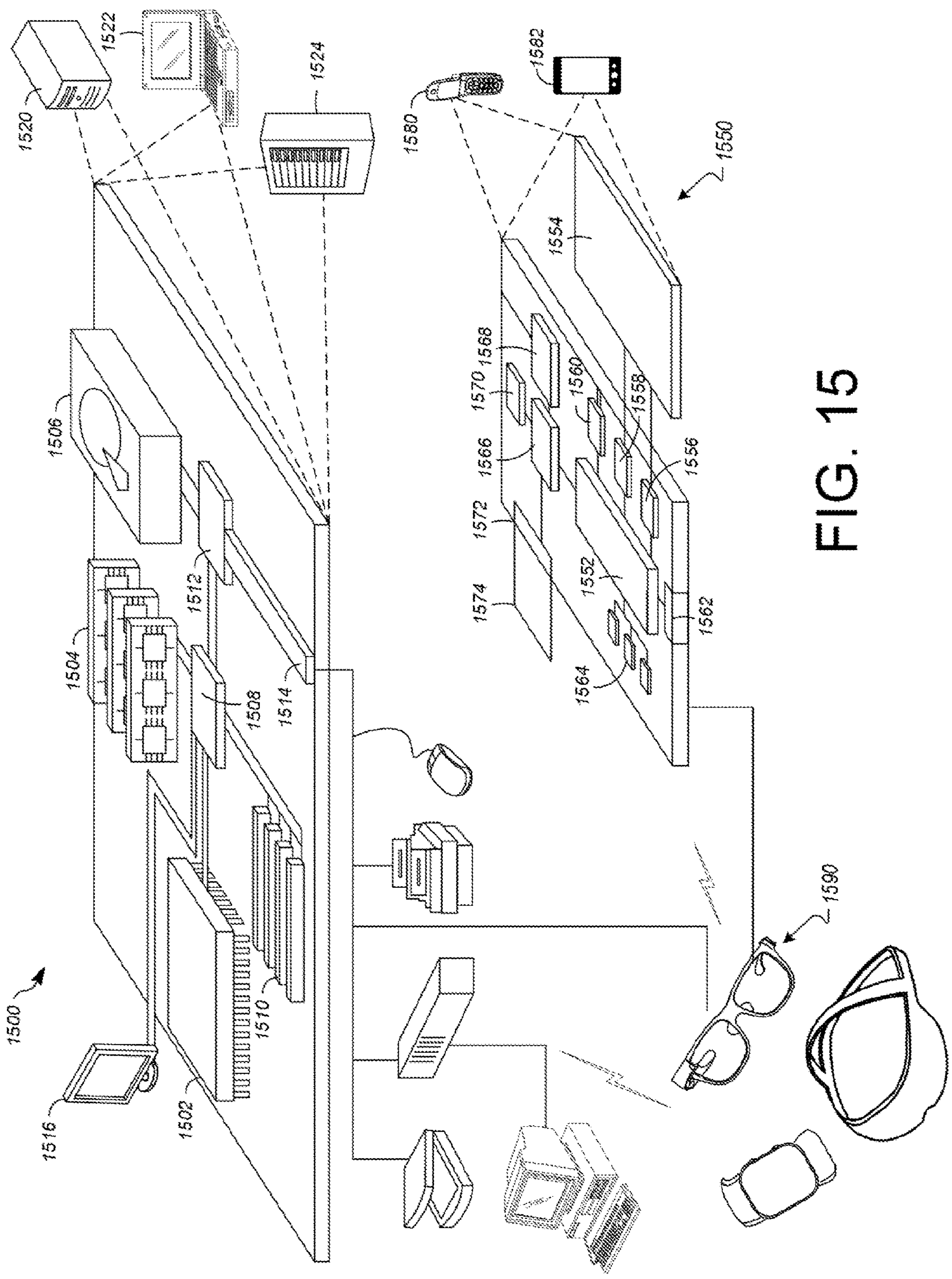
FIG. 15 illustrates an example computing environment, which may be used with the techniques described here.

FIG. 15 illustrates an example of a computer device 1500 and a mobile computer device 1550, which may be used with the techniques described here (e.g., a computing environment for the motion capture system). The computing device 1500 includes a processor 1502, memory 1504, a storage device 1506, a high-speed interface 1508 connecting to memory 1504 and high-speed expansion ports 1510, and a low-speed interface 1512 connecting to low-speed bus 1514 and storage device 1506. Each of the components 1502, 1504, 1506, 1508, 1510, and 1512, are interconnected using various busses, and may be mounted on a common motherboard or in other manners as appropriate. The processor 1502 can process instructions for execution within the computing device 1500, including instructions stored in the memory 1504 or on the storage device 1506 to display graphical information for a GUI on an external input/output device, such as display 1516 coupled to high-speed interface 1508. In other implementations, multiple processors and/or multiple buses may be used, as appropriate, along with multiple memories and types of memory. Also, multiple computing devices 1500 may be connected, with each device providing portions of the necessary operations (e.g., as a server bank, a group of blade servers, or a multi-processor system).

The memory 1504 stores information within the computing device 1500. In one implementation, the memory 1504 is a volatile memory unit or units. In another implementation, the memory 1504 is a non-volatile memory unit or units. The memory 1504 may also be another form of computer-readable medium, such as a magnetic or optical disk.

The storage device 1506 is capable of providing mass storage for the computing device 1500. In one implementation, the storage device 1506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1504, the storage device 1506, or memory on processor 1502.

The high-speed controller 1508 manages bandwidth-intensive operations for the computing device 1500, while the low-speed controller 1512 manages lower bandwidth-intensive operations. Such allocation of functions is example only. In one implementation, the high-speed controller 1508 is coupled to memory 1504, display 1516 (e.g., through a graphics processor or accelerator), and to high-speed expansion ports 1510, which may accept various expansion cards (not shown). In the implementation, low-speed controller 1512 is coupled to storage device 1506 and low-speed expansion port 1514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1500 may be implemented in a number of different forms, as shown in the figure. For example, it may be implemented as a standard server 1520, or multiple times in a group of such servers. It may also be implemented as part of a rack server system 1524. In addition, it may be implemented in a personal computer such as a laptop computer 1522. Alternatively, components from computing device 1500 may be combined with other components in a mobile device (not shown), such as device 1550. Each of such devices may contain one or more of computing device 1500, 1550, and an entire system may be made up of multiple computing devices 1500, 1550 communicating with each other.

Computing device 1550 includes a processor 1552, memory 1564, an input/output device such as a display 1554, a communication interface 1566, and a transceiver 1568, among other components. The device 1550) may also be provided with a storage device, such as a microdrive or other device, to provide additional storage. Each of the components 1550, 1552, 1564, 1554, 1566, and 1568, are interconnected using various buses, and several of the components may be mounted on a common motherboard or in other manners as appropriate.

The processor 1552 can execute instructions within the computing device 1550, including instructions stored in the memory 1564. The processor may be implemented as a chipset of chips that include separate and multiple analog and digital processors. The processor may provide, for example, for coordination of the other components of the device 1550, such as control of user interfaces, applications run by device 1550, and wireless communication by device 1550.

Processor 1552 may communicate with a user through control interface 1558 and display interface 1556 coupled to a display 1554. The display 1554 may be, for example, a TFT LCD (Thin-Film-Transistor Liquid Crystal Display), and LED (Light Emitting Diode) or an OLED (Organic Light Emitting Diode) display, or other appropriate display technology. The display interface 1556 may include appropriate circuitry for driving the display 1554 to present graphical and other information to a user. The control interface 1558 may receive commands from a user and convert them for submission to the processor 1552. In addition, an external interface 1562 may be provided in communication with processor 1552, so as to enable near area communication of device 1550 with other devices. External interface 1562 may provide, for example, for wired communication in some implementations, or for wireless communication in other implementations, and multiple interfaces may also be used.

The memory 1564 stores information within the computing device 1550. The memory 1564 can be implemented as one or more of a computer-readable medium or media, a volatile memory unit or units, or a non-volatile memory unit or units. Expansion memory 1574 may also be provided and connected to device 1550 through expansion interface 1572, which may include, for example, a SIMM (Single In-Line Memory Module) card interface. Such expansion memory 1574 may provide extra storage space for device 1550, or may also store applications or other information for device 1550. Specifically, expansion memory 1574 may include instructions to carry out or supplement the processes described above, and may include secure information also. Thus, for example, expansion memory 1574 may be provided as a security module for device 1550, and may be programmed with instructions that permit secure use of device 1550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1564, expansion memory 1574, or memory on processor 1552, that may be received, for example, over transceiver 1568 or external interface 1562.

Device 1550 may communicate wirelessly through communication interface 1566, which may include digital signal processing circuitry where necessary. Communication interface 1566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1568. In addition, short-range communication may occur, such as using a Bluetooth, Wi-Fi, or other such transceiver (not shown). In addition, GPS (Global Positioning System) receiver module 1570 may provide additional navigation- and location-related wireless data to device 1550, which may be used as appropriate by applications running on device 1550.

Device 1550 may also communicate audibly using audio codec 1560, which may receive spoken information from a user and convert it to usable digital information. Audio codec 1560 may likewise generate audible sound for a user, such as through a speaker, e.g., in a handset of device 1550. Such sound may include sound from voice telephone calls, may include recorded sound (e.g., voice messages, music files, etc.) and may also include sound generated by applications operating on device 1550.

The computing device 1550) may be implemented in a number of different forms, as shown in the figure. For example, it may be implemented as a cellular telephone 1580. It may also be implemented as part of a smartphone 1582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well: for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in the figure can include sensors that interface with an AR headset/HMD device 1590 to generate an augmented environment for viewing inserted content within the physical space. For example, one or more sensors included on a computing device 1550 or other computing device depicted in the figure, can provide input to the AR headset 1590 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 1550 can use the sensors to determine an absolute position and/or a detected rotation of the computing device in the AR space that can then be used as input to the AR space. For example, the computing device 1550 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer. In some implementations, the user can aim at a target location using a virtual laser pointer.

In some implementations, one or more input devices included on, or connect to, the computing device 1550 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1550 when the computing device is incorporated into the AR space can cause a particular action to occur in the AR space.

In some implementations, a touchscreen of the computing device 1550 can be rendered as a touchpad in AR space. A user can interact with the touchscreen of the computing device 1550. The interactions are rendered, in AR headset 1590 for example, as movements on the rendered touchpad in the AR space. The rendered movements can control virtual objects in the AR space.

In some implementations, one or more output devices included on the computing device 1550 can provide output and/or feedback to a user of the AR headset 1590 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1550 may appear as another object in a computer-generated, 3D environment. Interactions by the user with the computing device 1550 (e.g., rotating, shaking, touching a touchscreen, swiping a finger across a touch screen) can be interpreted as interactions with the object in the AR space. In the example of the laser pointer in an AR space, the computing device 1550 appears as a virtual laser pointer in the computer-generated, 3D environment. As the user manipulates the computing device 1550, the user in the AR space sees movement of the laser pointer. The user receives feedback from interactions with the computing device 1550 in the AR environment on the computing device 1550 or on the AR headset 1590. The user's interactions with the computing device may be translated to interactions with a user interface generated in the AR environment for a controllable device.

In some implementations, a computing device 1550 may include a touchscreen. For example, a user can interact with the touchscreen to interact with a user interface for a controllable device. For example, the touchscreen may include user interface elements such as sliders that can control properties of the controllable device.

Computing device 1500 is intended to represent various forms of digital computers and devices, including, but not limited to laptops, desktops, workstations, personal digital assistants, servers, blade servers, mainframes, and other appropriate computers. Computing device 1550 is intended to represent various forms of mobile devices, such as personal digital assistants, cellular telephones, smartphones, and other similar computing devices. The components shown here, their connections and relationships, and their functions, are meant to be examples only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

What is claimed is:

1. A method for motion capture, the method comprising:
coupling ultra-wideband (UWB) tags to a body;
constructing a distance matrix, wherein the constructing includes:
successively configuring each UWB tag as an anchor tag;
determining distances between the anchor tag and other UWB tags; and
updating the distance matrix with the determined distances until each UWB tag has been configured as the anchor tag;
checking a validity of the distance matrix;
reconstructing a skeletal topology of the body based on the distance matrix, the skeletal topology including nodes corresponding to three-dimensional (3D) positions of the UWB tags; and
repeating the constructing, the checking, and the reconstructing to generate a set of skeletal topologies, the set of skeletal topologies arranged in time to capture a motion of the body.

2. The method for motion capture according to claim 1, wherein the body includes a first object and a second object, a first portion of the UWB tags coupled to the first object and a second portion of the UWB tags coupled to the second object.

3. The method for motion capture according to claim 1, wherein a first UWB tag of the UWB tags is integrated with augmented reality (AR) glasses worn by a user.

4. The method for motion capture according to claim 1, wherein the distance matrix is a Euclidean distance matrix.

5. The method for motion capture according to claim 4, wherein checking the validity of the Euclidean distance matrix includes:
comparing off-diagonal elements of the Euclidean distance matrix to a first threshold;
comparing diagonal elements of the Euclidean distance matrix to a second threshold;
determining that the Euclidean distance matrix is invalid if any off-diagonal element is below the first threshold and if any diagonal element is above the second threshold;
discarding the Euclidean distance matrix before reconstructing the skeletal topology; and
constructing a new Euclidean distance matrix.

6. The method for motion capture according to claim 1, further comprising:
capturing calibration data using a hub device communicatively coupled to the UWB tags, the calibration data including identification information of each UWB tag, the calibration data corresponding to a topology of the UWB tags in a fixed coordinate system; and
reconstructing the skeletal topology based on the distance matrix and the calibration data.

7. The method for motion capture according to claim 1, further comprising transmitting the motion of the body to an augmented reality application, the motion of the body captured in real time.

8. The method for motion capture according to claim 1, wherein determining distances between the anchor tag and other UWB tags includes:
measuring round-trip times of handshake signals transmitted between the anchor tag and the other UWB tags.

9. A system for motion capture comprising:
a first set of ultra-wideband (UWB) tags coupled to a first body, wherein UWB tags in the first set are configurable to take turns performing a handshake protocol with each other to determine elements of a distance matrix for the first set, the elements corresponding to pair-wise distances between the UWB tags; and
a hub device communicatively coupled to one or more of the UWB tags, the hub device including a processor configured by software instructions to:
check a validity of the distance matrix before reconstructing a skeletal topology of the first body based on the distance matrix; and
reconstruct the skeletal topology of the first body based on the distance matrix.

10. The system for motion capture according to claim 9, wherein the processor of the hub device is further configured by software instructions to:
generate a set of skeletal topologies from a plurality of distance matrices generated at regular intervals.

11. The system for motion capture according to claim 9, wherein the processor of the hub device is further configured by software instructions to:
receive elements of the distance matrix from each UWB tag; and
generate the distance matrix from the elements.

12. The system for motion capture according to claim 9, wherein the processor of the hub device is further configured by software instructions to:
receive a distance matrix generated by one of the UWB tags.

13. The system for motion capture according to claim 9, wherein:
the UWB tags communicate the handshake protocol using ultra-wideband communication; and the hub device is communicatively coupled to the UWB tags using Bluetooth communication.

14. The system for motion capture according to claim 9, wherein the hub device is augmented-reality glasses that includes a UWB tag that is in the first set of UWB tags.

15. The system for motion capture according to claim 9, further comprising:

a second set of ultra-wideband tags coupled to a second body, wherein UWB tags in the second set are configurable to take turns performing a handshake protocol with each other to determine elements of a second distance matrix for the second set, the second set of UWB tags configured to communicate the second distance matrix to the hub device for reconstruction of a skeletal topology of the second body.

16. The system for motion capture according to claim 9, wherein the distance matrix is a Euclidean distance matrix and the processor of the hub device is further configured by software instructions to:

check a validity of the Euclidean distance matrix by comparing a off-diagonal elements of the Euclidean distance matrix to a first threshold and comparing diagonal elements of the Euclidean distance matrix to a second threshold.

17. The system for motion capture according to claim 9, wherein the processor of the hub device is further configured by software instructions to:

generate a set of skeletal topologies at regular intervals over time;

capture a motion of the first body based on the set of skeletal topologies; and transmit the motion of the first body to a motion-capture application.

18. A method for motion capture, the method comprising:

acquiring round-trip times between pairs of ultra-wideband (UWB) tags affixed to points on a body, the round-trip times based on a handshake protocol; and estimating a pose of the body by:

computing a distance matrix based on the round-trip times;

checking a validity of the distance matrix;

reconstructing a skeletal topology of the body, the skeletal topology including nodes corresponding to three-dimensional (3D) positions of the points the body; and repeating the acquiring and the estimating to capture a motion of the body.

19. The method for motion capture according to claim 18, wherein the distance matrix is a Euclidean distance matrix.

20. The method for motion capture according to claim 18, further comprising transmitting the motion of the body to an augmented reality application.

* * * * *